Figure 1:
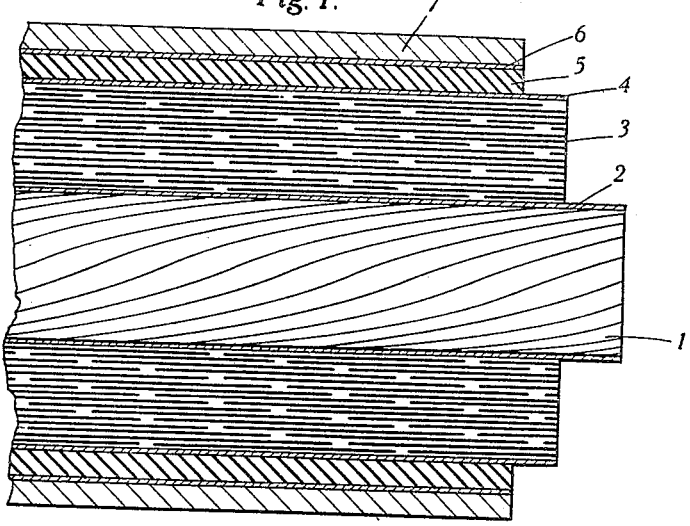

April 8, 1941.  C. J. BEAVER ET AL  2,237,402

ELECTRIC CABLE AND JOINT THEREFOR

Filed April 7, 1939   5 Sheets-Sheet 1

Inventors
Charles James Beaver
Edward Leslie Davey
by
Stebbins, Blenko & Parmelee,
Attorneys April 8, 1941.   C. J. BEAVER ET AL   2,237,402
ELECTRIC CABLE AND JOINT THEREFOR
Filed April 7, 1939   5 Sheets-Sheet 2

Inventors
Charles James Beaver
Edward Leslie Davey,
by
Stebbins, Blenko & Parmelee,
Attorneys

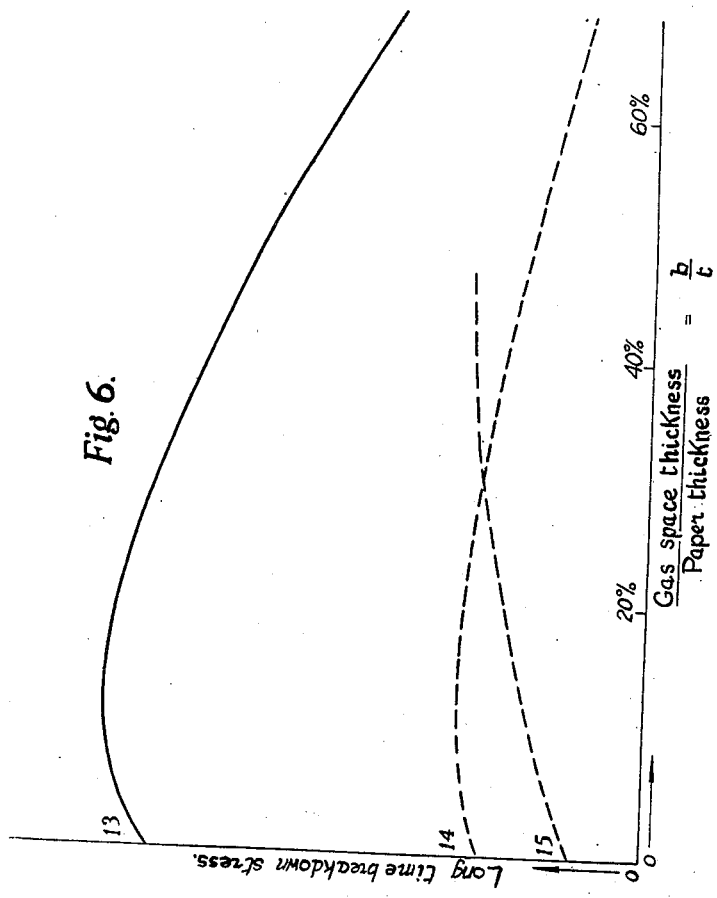

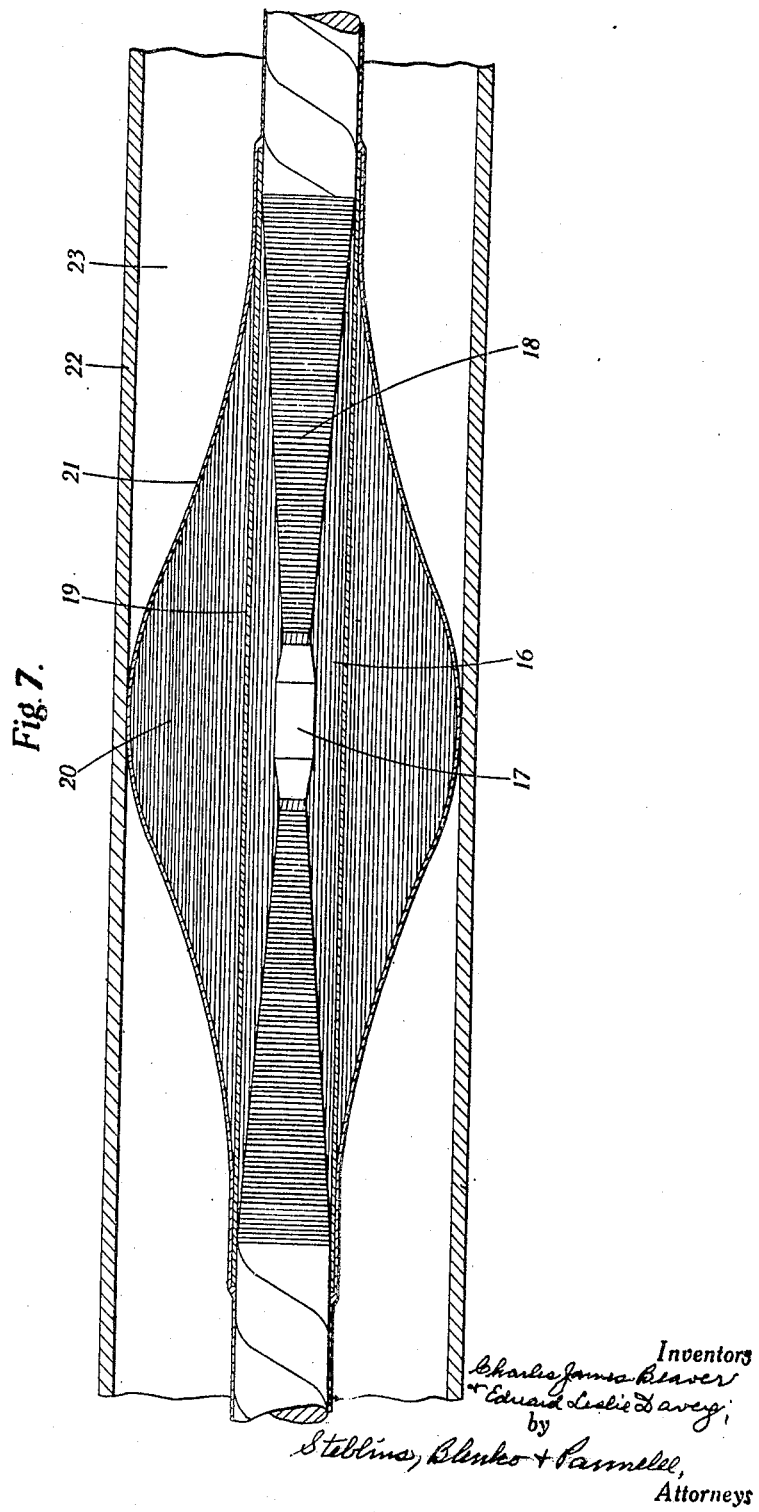

Patented Apr. 8, 1941

2,237,402

UNITED STATES PATENT OFFICE 2,237,402

ELECTRIC CABLE AND JOINT THEREFOR

Charles James Beaver, Bowdon, and Edward Leslie Davey, Timperley, England, assignors to W. T. Glover & Company Limited, Manchester, England, a British company Application April 7, 1939, Serial No. 266,698
In Great Britain April 23, 1938

12 Claims. (Cl. 174—25)

This invention relates to electric cables of the kind having a composite dielectric formed of layers of helical windings of impregnated paper having in the interstices gas at atmospheric or some higher pressure. The paper is impregnated with a material and under conditions which cause such material to be retained in the paper or on the surfaces thereof throughout the range of working conditions of the cable: it may therefore be described as "permanently impregnated." Gas occupies the remainder of the space, that is the interstices between the turns of each layer and between the layers. A cable of this kind (with gas at super-atmospheric pressure) is described in the specification of Patent No. 2,067,169.

It has been generally recognised that with the usual methods of manufacture there probably is a thin layer of gas between adjacent layers of paper. It has been proposed to provide for artificially increasing the thickness of this layer, for instance, by embossing the paper so as to provide projections, or by providing separate spacing means between the layers of paper.

As a result of extensive research it has been found that the electrical properties of such a composite dielectric are dependent on the proportion between the thickness of the paper and the thickness of the gas layer between adjacent layers of paper, and by the present invention an improved dielectric is provided as the result of making appropriate adjustments of this proportion.

The intrinsic electric strength of such a composite dielectric has a high value when the gas spaces between the layers of impregnated paper have radial dimensions within a definite range of values as specified below. It is found that on increasing the ratio of gas thickness to paper thickness from the practical minimum (which is obtained when smooth papers are applied in the usual way) the breakdown strength of the dielectric is at first increased and reaches a maximum and then decreases again. The breakdown strength here referred to is that under long time tests with alternating stress. The range of values of the radial dimension of the gas spaces in accordance with the invention is about 10% to 20% of the thickness of the adjacent layer of paper. The range may be extended to somewhat lower values for the thicker qualities of paper used.

The method of obtaining high intrinsic dielectric strength set out above can be applied to the whole, or to a part only, of the dielectric of a cable. It is applicable from atmospheric pressure to a practical upper limit of pressure. This may be regarded, at present, as about 250 lbs. per square inch (17 atmospheres) above atmospheric pressure, but there is no reason to assume that the advantageous effect of radial spacing would not be obtained beyond that value if for other reasons it were advantageous to use higher pressures.

It is found that by varying the ratio of thickness of gas layer to thickness of paper layer from point to point in the radial thickness of the dielectric a variation in the permittivity of the dielectric is produced. By a further feature of the invention this method of varying permittivity is used to provide a form of permittivity grading of the dielectric, and thereby the distribution of electric stress in the dielectric is controlled. As previously mentioned, it is recognised that it is a practical probability that, in composite dielectrics of the type to which the invention relates, a thin layer of gas will be found between adjacent layers of paper when lapped on without any intentional provision for spacing. By increasing the proportion of radial gas dimensions to paper thickness from the lowest value (which may or may not be the unintentional very small value just mentioned) in the region directly adjacent to the conductor in steps as the dielectric progresses outwardly, the permittivity is decreased in steps. In this way, the continuous rapid falling off in stress, which is obtained with a constant value of permittivity, is changed, the stress being stepped up at the points where changes of permittivity occur. By this method is obtained diminution of the overall thickness of the dielectric for a given value of maximum electrical stress.

The adjustment of the dimensions of the gas spaces, that is, the arrangement of the spacing of the layers of paper, is most conveniently obtained by embossing the paper so that comparatively small proportions of one surface thereof stand out of the general plane to a sufficient extent to give the desired spacing. It is advantageous to form the embossing as a pattern of wavy lines running, in general direction, substantially parallel with the length of the strip of the paper. Such a configuration can readily be embossed, by known methods, on paper as used for dielectric purposes and will remain substantially unchanged by the processes of impregnation and application to the cable.

Figure 4:
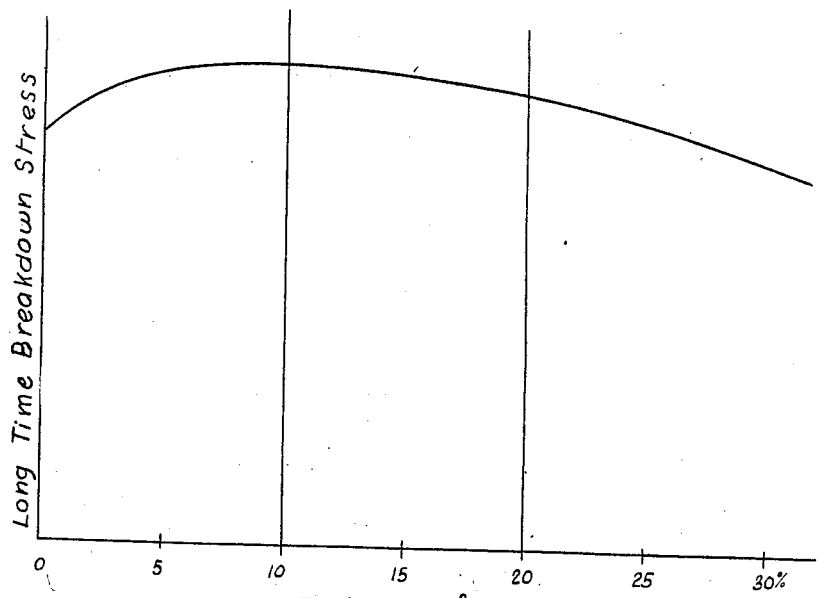
Figure 2:
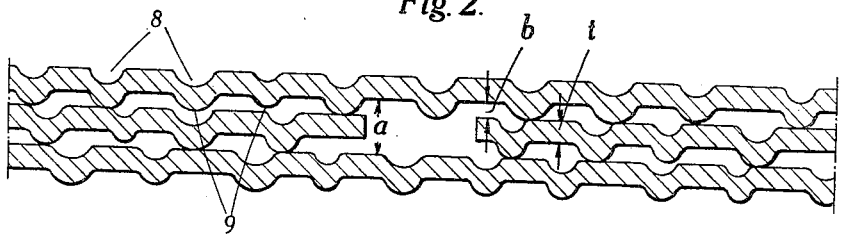
Figure 3:
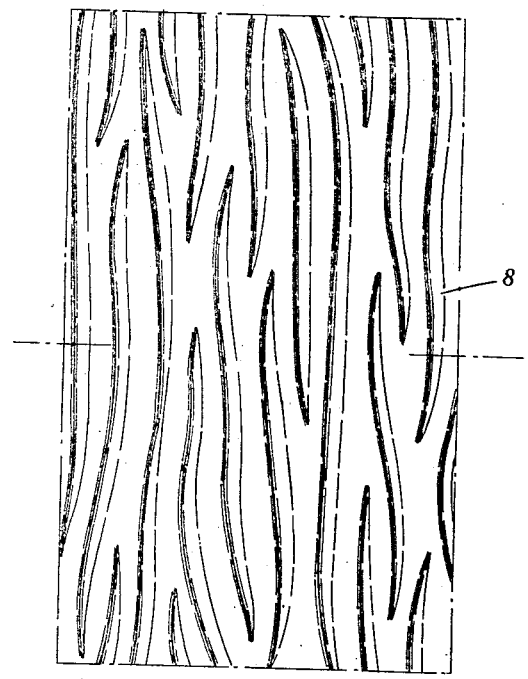
Figure 5:
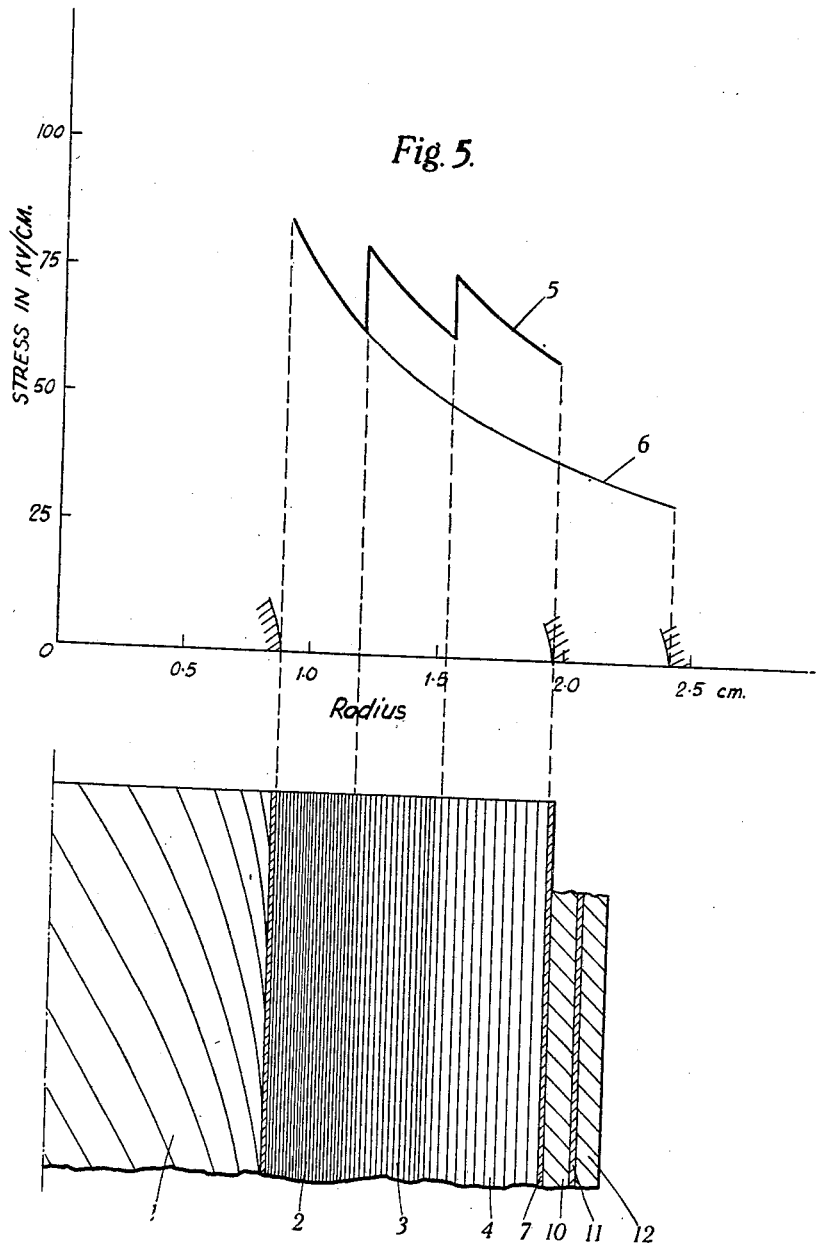

The invention will be further described by the aid of the accompanying drawings; in which Figure 1 is a conventional longitudinal section of a portion of a cable embodying the invention; Figure 2 is a much enlarged view in section shewing the arrangement of adjacent paper tapes; Figure 3 is a similarly enlarged view of the embossed surface of paper; and Figure 4 is a typical test curve. Figure 5 shews diagrammatically in section one half of a single core cable in which the dielectric is graded in accordance with this invention; it also shews in the upper part the distribution of the calculated stress as the result of the application of the invention in comparison with that in a cable designed for the same working voltage and constructed in the manner adopted prior to the invention. Figure 6 shews curves used in the design of the dielectric. Figure 7 shews, in longitudinal section, a cable joint in which the invention is embodied.

The cable shown in Figure 1 has the general form of assembly of parts of an extra high tension cable of the kind to which the invention relates (as hereinbefore indicated). This comprises the stranded conductor 1 (which is covered with a thin metal tape or foil 2, for the purpose of providing a smooth outer surface for the conductor), the dielectric 3, with a metallised paper layer 4, serving as an electrostatic screen to the outer surface (this layer being preferably perforated), the lead sheath 5, reinforcing tape 6, and an outer protective layer 7, which may be a second sheath or layers of impregnated fabric. The metal tape 2, the metallised paper 4 and the reinforcing tape 6 will, as usual, be lapped on helically. No attempt has been made to show this in the drawings.

The dielectric is built up of paper tapes which have been impregnated before application to the conductor, as previously indicated herein.

The paper, instead of having the usual smooth surface, is embossed, as shown in Figures 2 and 3. By this embossing depressions are made, as at 8, in one side of the paper, so as to produce projecting lines 9 on the other side. The lines are not straight but have a wavy form, as shown in Figure 3, with some degree of irregularity so that it is impossible in practice that a set of lines 9 in one layer of paper should register and fit in with a set of depressions 8 in an adjacent layer. The general direction of the lines is parallel with the length of the paper tape so that a longitudinal section taken as in Figure 2 cuts the lines substantially at right angles. It will be seen, by reference to Figure 2, that the adjacent layers of paper are, as the result of embossing, spaced apart by a distance, indicated in Figure 2 by the letter $b$, which is a certain fraction of the thickness of the unembossed paper $t$. The projections occupy a very minor part of the space between layers of paper so that the distance $b$ may be taken as the effective thickness on the gas layer.

In Figure 4 is given an experimental curve obtained as the results of tests with paper having a thickness $t$ to 2.5 mils (.064 mm.) impregnated and embossed in accordance with the invention and filled with nitrogen under a pressure of 200 lbs. (14.6 atmospheres) per square inch above atmospheric pressure.

The tests were made by means of a number of samples of paper having different heights of embossing so as to give different values of the dimension $b$, which is expressed as a percentage of the thickness of paper $t$. The tests were carried out by the application of alternating stress by the method of long time breakdown, the points on the curve representing values of stress at which breakdown does not occur within 50 hours. It will be seen that the curve rises at first from the value representing the existence of a gas layer of negligible thickness, taken as zero. This rise is not continued, but the curve reaches a maximum and continues to fall as the dimension $b$ is increased in proportion to the dimension $t$. It is seen that in the region in which $b$ has a value 10–20% of $t$, high values are obtained. High values are also obtainable for lower ratios than 10%, but it is found that, with thin papers, such small actual values of $b$ as correspond to less than 10% cannot be reliably obtained in manufacture. For this reason values in the region somewhat below 10% (which are included in the invention) can only be adopted when the thicker qualities of paper can be used. In general this cannot be done, in the part of the dielectric near the conductor, when making efficient designs for extra high tension cables, since the dimension $a$ (Figure 2) is increased as the dimension $t$ is increased and forms a determining limit in the strength of the dielectric.

The improved construction of the dielectric is applicable to cables having more than one core, as well as to single core cables. It can be used throughout the dielectric or as a part thereof. In Figure 5 it forms one part of a graded dielectric.

In this example the cable is designed to form part of a 132 kv. three-phase system. The cable is of the type described in Specification No. 2,067,169 that is to say it has a dielectric formed of permanently impregnated paper and works with a gas pressure substantially above atmospheric pressure, namely, 200 lbs. per square inch (13.6 atmospheres). The conductor 1 has a diameter of 1.74 cm. and is formed with a smooth surface. The dielectric is in three sections for the purpose of grading. The innermost section 2 consists of plain paper, that is paper of the ordinary kind without any raising of lines on the surface by embossing so that the minimum gas layer thickness (in fact, a thickness of negligible value) is obtained between the layers of paper in this section. In the two outer sections 3 and 4 the paper is embossed and the embossing in section 4 raises the spacing lines higher than in section 3. The effect of this embossing is to provide gas layers between the paper layers and thus to give an effective permittivity in section 3 which is lower than that in section 2 and an effective permittivity in section 4 which is lower than that in section 3. The dimensions and the calculated values in this design are given in the following table:

| Paper | Paper thickness, cm. | Individual paper thickness ($t$), mm. | Gas thickness ÷ thickness i. e. $\left(\frac{b}{t}\right)$% | Permittivity | Stress kv./cm. at— | |
|---|---|---|---|---|---|---|
| | | | | | Inner radius | Outer radius |
| Plain | .32 | .045 | 0 | 3.0 | 85 | 62.5 |
| Embossed | .34 | .062 | 16 | 2.35 | 80 | 62.5 |
| Do | .42 | .100 | 28.5 | 1.96 | .75 | 59.0 |
| Total | 1.08 | | | | | |

Some of these quantities are also shown in Figure 5. In the upper part of this figure the way in which the stress in the dielectric is distributed is shown in the stepped curve 5 and, in comparison with this, is shown by the lower curve 6 the distribution of stress in a cable designed, in accordance with known methods, for the same type and rating employing a uniform dielectric of unembossed paper. This comparative cable has a radial thickness of dielectric of 1.52 cm. and a stress varying from 85 kv. per centimetre at the conductor to 38 kv. per centimetre at the sheath.

The method of calculating the design of the graded dielectric will be indicated hereinafter. The cable in the example is completed by an electric screen 7 on the outside of the dielectric, enclosing sheath 10, reinforcement (usually in the form of metal tape) 11, and a protective covering 12, which may be a second sheath or lappings of impregnated fabric. The paper tapes of the dielectric, the screen 7 and reinforcement 11 will, as usual, be applied helically.

The design of the graded dielectric may be carried out in the following manner.

Starting from a given design value of dielectric stress at the conductor surface corresponding to the permittivity of the paper selected for the innermost part of the dielectric (section 2 of Figure 5), the electric stress at any point in the dielectric will vary inversely as the radial distance of the point from the centre of the conductor and also inversely as the permittivity through section 2.

The type of paper is maintained unchanged until a sufficient thickness has been applied to cause the stress to decrease to a practical fraction of the stress at the conductor, for instance, to 0.75 or 0.80 of this stress.

At this radius the change of paper is made. The thickness to be used may be decided largely on known mechanical considerations, including the effect of distance from the neutral axis when the cable is bent. The thickness of the gas layer is determined by a comparison of the working stress applicable to the dielectric with the dielectric stress imposed by the conditions at the radius under consideration. This comparison is conveniently carried out graphically, as shown in Figure 4, by plotting curves on a basis of the proportion of gas space thickness to paper thickness for the selected paper. A first curve can be plotted from experimental results to show the long time breakdown stress. Such a curve is shown, marked 13 in Figure 6. It is similar to the curve in Figure 4. From this a second curve, such as 14, can be plotted, this being calculated so that the ratio of the ordinates of the two curves is constant and equal to the ratio adopted in fixing the dielectric stress at the conductor surface. A third curve, such as 15, is then plotted to show the imposed dielectric stress. This can be calculated for the conditions at the radius in question using experimentally obtained values for the effective permittivity of the dielectric. The intersection of the second and third curves gives the gas space thickness to be used. The curve 13 is dependent largely on the dimension $a$ in Figure 2 of the gas spaces located between the edges of adjacent turns in a layer of paper, since breakdown is found in most cases to be initiated in such spaces. The curve 15 is dependent mainly on the dimension $b$ of the gas spaces between adjacent layers of paper.

The procedure above indicated gives a figure for the dielectric stress at the inner boundary of the second section (section 3) of the dielectric. This section is continued until the stress has decreased to an appropriate practical fraction of the stress at the inner boundary and then, if necessary, a further change is made in the quality of the dielectric in the same manner as above indicated.

It is not necessary, of course, that the innermost papers should be plain; embossed paper can be used at this position also. Higher values of the thickness proportion ($b/t$) than those given in the example may be used. The proportion may, for instance, go up to 80%, in some cases, for instance the outer parts of the dielectrics of high voltage cables with small conductors. It will be seen that the method of design described will provide that, for the higher values of this proportion, lower maximum stresses will result at the step up, since the effective strength of the dielectric is reduced for the larger proportion of gas (see curves 13 and 14, Figure 4).

The invention is applicable, not only to the parts of the cable installation manufactured in the factory, but also to the parts which have to be made after laying, namely the joints. In these there is usually a high ratio between the outer and inner diameters of the dielectric and grading is accordingly of particular benefit. The present method is readily applicable to the dielectric of joints. An example is shown in Figure 7. The inner part 16 of such dielectric may be made in the usual way by lappings applied with a minimum of gas spaces and built up to a smooth cylindrical surface over the jointing ferrule 17 and tapered ends of the cable dielectric 18. A closely fitting bakelised paper tube 19 is slipped over the built-up dielectric 16 to form a foundation for the outer part of the dielectric. This is formed of paper 20 applied as a pre-formed tube, put on by a coiling process and tightened down in known manner. This paper tube has appropriately dimensioned gas spaces, provided by embossing the paper, so as to adjust the permittivity appropriately. Two or more tubes may be successively applied with different depths of embossing in each one, or a composite tube in which the depth of embossing varies along the length of the strip of paper of which it is composed may be used. In some cases, as in the example shown, it is sufficient to use a single depth of embossing in combination with the unembossed inner layer of insulation, directly adjacent to the conductor, in order to obtain a stepping down of the permittivity and a corresponding reduction of the range of stress variation in the outer parts of the dielectric. This outer part 20 of the dielectric is enclosed in a covering 21, which may be formed of several layers of varnished silk tape. This performs the function of preventing the compound, with which the space 23 inside the joint sleeve 22 is filled, from penetrating into the part 20 of the dielectric. In a screened joint a conducting tape is applied over the covering 21 to relieve the compound in space 23 from electric stress. When the gas in the cable is under superatmospheric pressure this is communicated to the gas spaces between the turns of the paper 20 by way of helical paths under and between the turns of varnished silk tape 21.

The use of the gas-spaced paper in the outer part 20 of the dielectric reduces the stress in inner part 16 and also reduces the voltage gradient along the surfaces of the tapered cable ends 18.

What we claim as our invention is:

1. An insulated conductor, in which the dielectric comprises layers of permanently impregnated paper, gas at atmospheric pressure or higher filling the interstices between the turns and layers of paper and means for positively spacing the paper layers radially, said means providing that the thickness ($b$) of gas layers between adjacent layers of paper is about 10-20% of the thickness ($t$) of one of said layers of paper.

2. An insulated conductor, in which the dielectric comprises layers of permanently impregnated paper, gas at atmospheric pressure or higher filling the interstices between the turns and layers of paper, and means for positively spacing the paper layers radially, said means being uniformly distributed between the layers and providing that the ratio of thickness ($b$) of gas layer to thickness ($t$) of paper layer is constant over the whole area of each layer and is higher at a point in the dielectric remote from the conductor than at a point near thereto.

3. An insulated conductor, in which the dielectric comprises layers of permanently impregnated paper, gas at atmospheric pressure or higher filling the interstices between the turns and layers of paper, said dielectric being formed of at least two co-axial sections, of which a section nearer to the conductor has a ratio of radial thickness ($b$) of gas layer to radial thickness ($t$) of paper layer less than the said ratio in a section further from the conductor, the ratio in each case being constant over the whole area of each layer, positive spacing means between paper layers in the latter section providing this condition.

4. An insulated conductor, in which the dielectric comprises layers of permanently impregnated paper, gas at atmospheric pressure or higher filling the interstices between the turns and layers of paper, said dielectric being formed of at least two co-axial sections, of which sections one near to the conductor has the gas layers between the paper layers of almost zero thickness radially, and a section further from the conductor has the gas layers between the paper layers of a definite thickness which is less than the thickness of a paper layer and constant over the whole area of each layer, positive spacing means between paper layers in the latter section providing this condition.

5. An insulated electric conductor having a permittivity-graded dielectric comprising layers of permanently impregnated paper and gas at atmospheric pressure or higher filling the interstices between the turns and layers of paper, the permittivity being made less in a portion of the dielectric remote from the conductor than in a portion near the conductor by making the proportion of gas to paper in the dielectric greater in said remote portion than in said near portion, positive spacing means between paper layers in said remote portion providing this condition.

6. An insulated conductor, in which the dielectric comprises layers of permanently impregnated paper, gas at atmospheric pressure or higher filling the interstices between the turns and layers of paper, and means for positively spacing the paper layers radially, said dielectric being formed of at least two co-axial sections, an inner section having a ratio of radial thickness ($b$) of gas layer to radial thickness ($t$) of paper layer in the range 10-20% and an outer section having a value of the said ratio greater than 20%, positive spacing means between paper layers in said two sections providing these conditions.

7. An insulated conductor, in which the dielectric comprises layers of permanently impregnated paper and gas at atmospheric pressure or higher filling the interstices between the turns and layers of paper, said dielectric being formed of at least two co-axial sections of which the outer section has a ratio of radial thickness ($b$) of gas layer to radial thickness ($t$) of paper in the range 10-20% and has means for positively spacing the paper layers to provide this condition and the inner section has a value of said ratio less than 10%.

8. An insulated conductor, in which the dielectric comprises layers of permanently impregnated paper, gas at atmospheric pressure or higher filling the interstices between the turns and layers of paper, said dielectric being formed of at least two co-axial sections, of which sections one near to the conductor has the gas layers between the paper layers of almost zero thickness radially, and a section further from the conductor has the gas layers between the paper layers of a definite thickness ($b$) in the range 10-20% of the thickness ($t$) of a paper layer, and positive spacing means between paper layers in the latter section providing this condition.

9. An insulated conductor, in which the dielectric comprises layers of permanently impregnated paper, gas at atmospheric pressure or higher filling the interstices between the turns and layers of paper, said paper having an embossed pattern of lines which space the paper layers radially making the thickness ($b$) of gas layers between adjacent layers of paper about 10-20% of the thickness ($t$) of one of said layers of paper.

10. An insulated electric conductor having a permittivity-graded dielectric comprising layers of permanently impregnated paper and gas at atmospheric pressure or higher filling the interstices between the turns and layers of paper, the permittivity being made less in a portion of the dielectric remote from the conductor than in a portion near the conductor by making the proportion of gas to paper in the dielectric greater in said remote portion than in said near portion by embossing a pattern of lines on the paper, the height of said embossing increasing from the inner part to the outer part of the dielectric and the embossed lines producing spacing uniform over the whole area of each layer of paper.

11. An insulated electric conductor having a permittivity-graded dielectric comprising layers of permanently impregnated paper and gas at atmospheric pressure or higher filling the interstices between the turns and layers of paper, the paper near to the conductor having a plain surface and the paper in a region further from the conductor having a surface provided with an embossed pattern of lines serving as means for spacing adjacent layers of paper apart uniformly over the area of each layer whereby to decrease the permittivity of the dielectric in this outer part.

12. An insulated electric conductor, comprising a joint between two lengths of conductor, a body of dielectric material built up by wrapping on closely layers of plain tape up to a smooth cylindrical surface over the conductor joint and adjacent parts, and then applying a wrapping of permanently impregnated and embossed paper, the embossing serving to space the paper layers, and gas under atmospheric or higher pressure between said paper layers.

CHARLES JAMES BEAVER.
EDWARD LESLIE DAVEY.